United States Patent [19]

Van Rosmalen et al.

[11] Patent Number: 5,581,534
[45] Date of Patent: Dec. 3, 1996

[54] DEVICE FOR REALIZING A LONGITUDINAL PATTERN OF SUBSTANTIALLY PARALLEL TRACKS IN A RECORD CARRIER WHICH CONTROLS MOVEMENT OF THE RECORD CARRIER ON THE BASIS OF TRACKPITCH

[75] Inventors: Gerard E. Van Rosmalen; Josephus A. H. M. Kahlman, both of Eindhoven, Netherlands

[73] Assignee: U.S. Philips Corporation, New York, N.Y.

[21] Appl. No.: 352,411

[22] Filed: Dec. 8, 1994

[30] Foreign Application Priority Data

Dec. 15, 1993 [BE] Belgium ............................... 09301395
Aug. 22, 1994 [EP] European Pat. Off. .............. 94202394

[51] Int. Cl.⁶ ..................................................... G11B 7/00
[52] U.S. Cl. ........................... 369/112; 369/111; 369/116; 250/235; 359/216
[58] Field of Search .............................. 369/13, 111, 112, 369/113, 116, 93, 99; 250/235, 236; 360/134; 359/216, 217, 218, 219

[56] References Cited

U.S. PATENT DOCUMENTS

| | | | |
|---|---|---|---|
| 4,661,941 | 4/1987 | Bell et al. ................................ | 369/111 |
| 4,669,070 | 5/1987 | Bell ......................................... | 369/111 |
| 4,901,297 | 2/1990 | Komatsu et al. ......................... | 369/13 |
| 5,157,650 | 10/1992 | Ozue et al. .............................. | 369/111 |
| 5,171,984 | 12/1992 | Van Rosmalen ........................ | 250/236 |
| 5,278,405 | 1/1994 | Zelenka ................................... | 250/235 |
| 5,418,764 | 5/1995 | Roth et al. ............................... | 369/116 |

FOREIGN PATENT DOCUMENTS

| | | | |
|---|---|---|---|
| 0459586A1 | 12/1991 | European Pat. Off. .......... | G11B 7/08 |
| 0658883A1 | 6/1995 | European Pat. Off. .......... | G11B 7/00 |

*Primary Examiner*—Loha Ben
*Attorney, Agent, or Firm*—Richard A. Weiss

[57] ABSTRACT

An optical scanning device for realizing in a recording layer of an optical tape a longitudinal path (i.e. pattern) of substantially parallel tracks. The device includes an optical system for focusing a radiation beam at the recording layer, which radiation beam causes a scanning spot to develop on the recording layer. The tracks are formed by the optical tape being cyclically scanned, through use of a polygon mirror, via the scanning spot and displaced relative to the optical system in a direction transverse to the scanning direction. The device further includes an optoelectrical measuring unit for deriving a measuring signal indicative of the track pitch of the successively produced tracks. The velocity of the displacement of the optical tape is controlled as a function of the measuring signal.

11 Claims, 8 Drawing Sheets

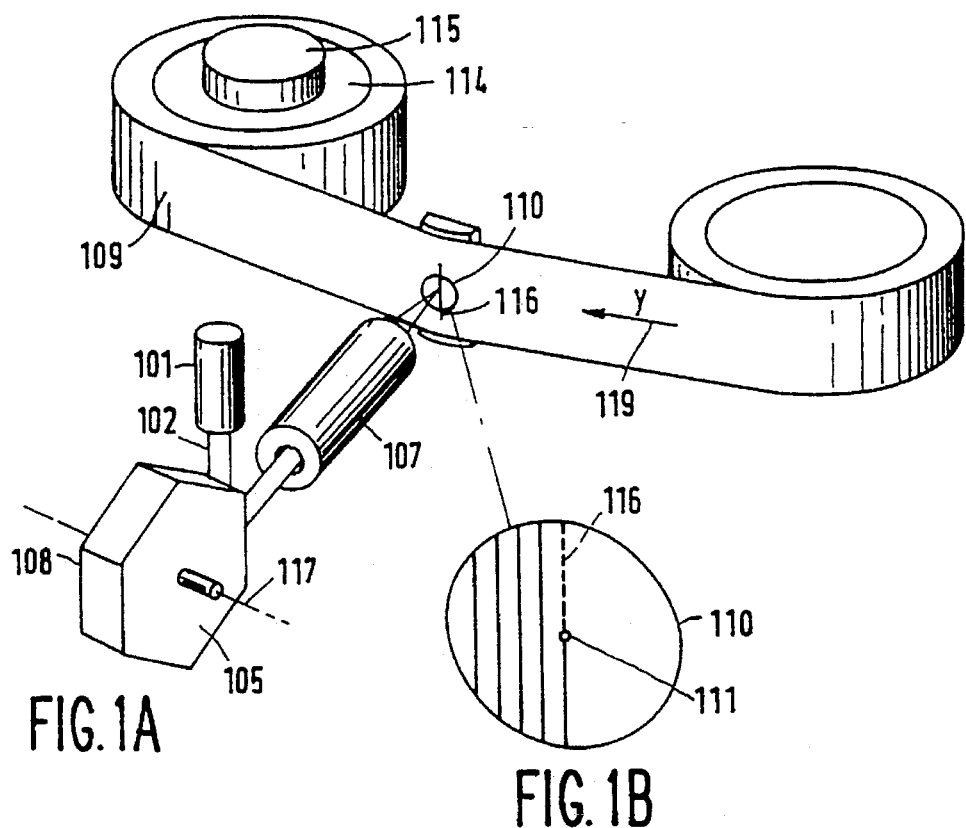
FIG. 1A
FIG. 1B
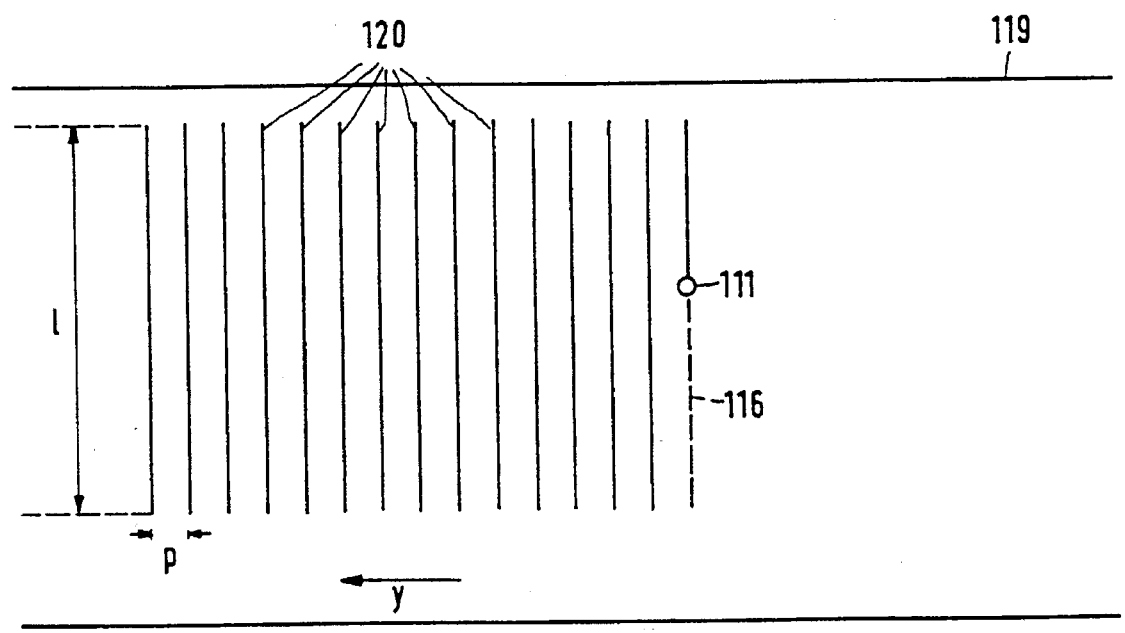
FIG. 2

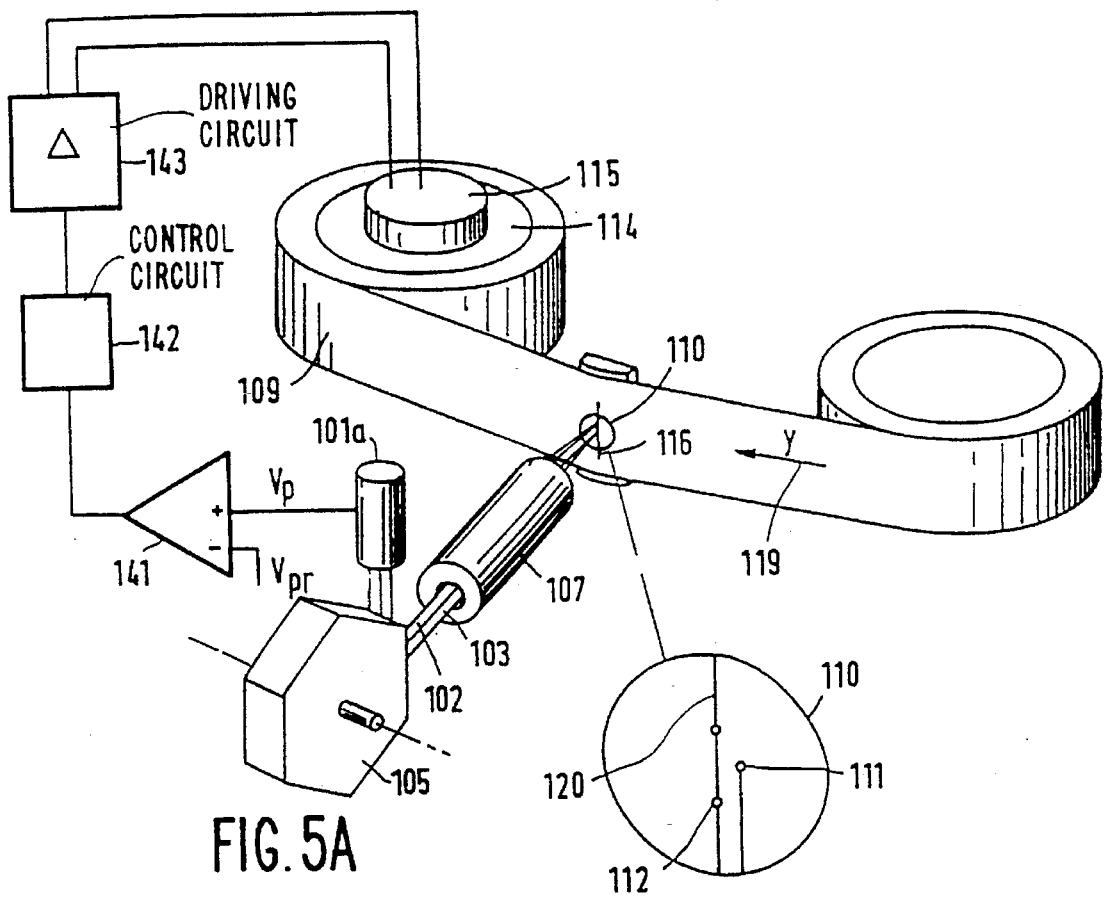
FIG.5A
FIG.5B
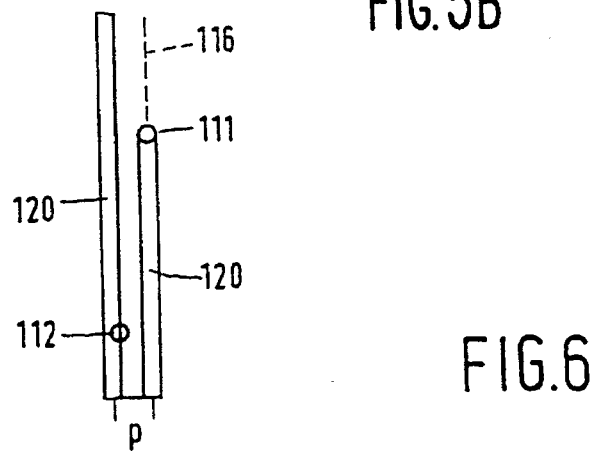
FIG.6
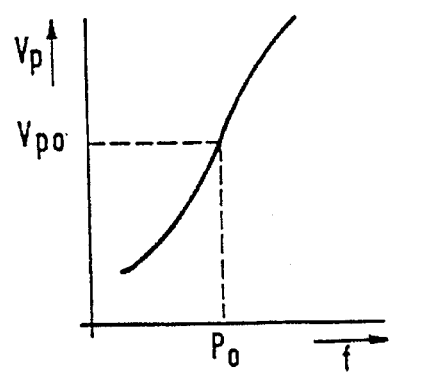
FIG.7

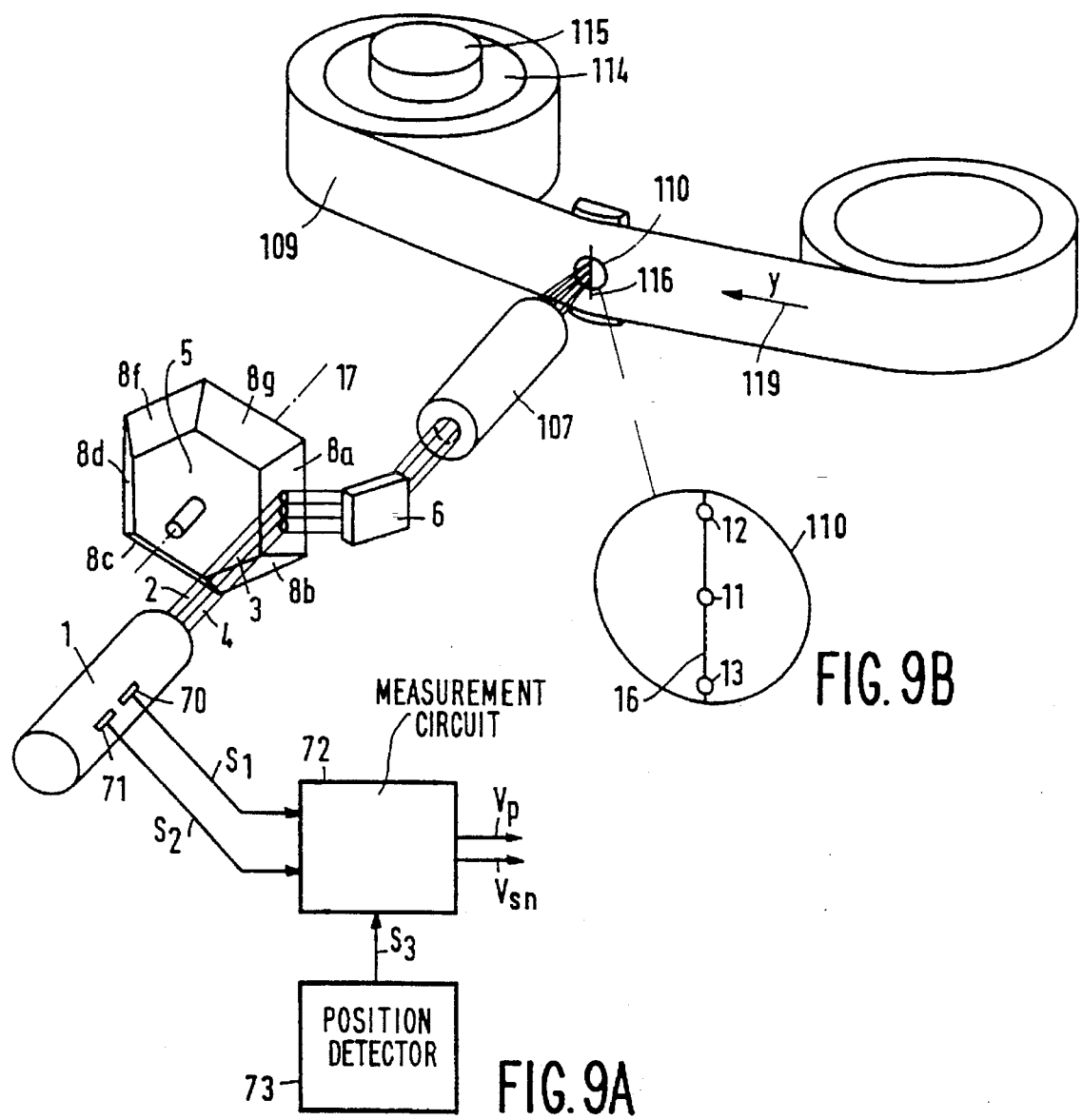
FIG. 9A
FIG. 9B
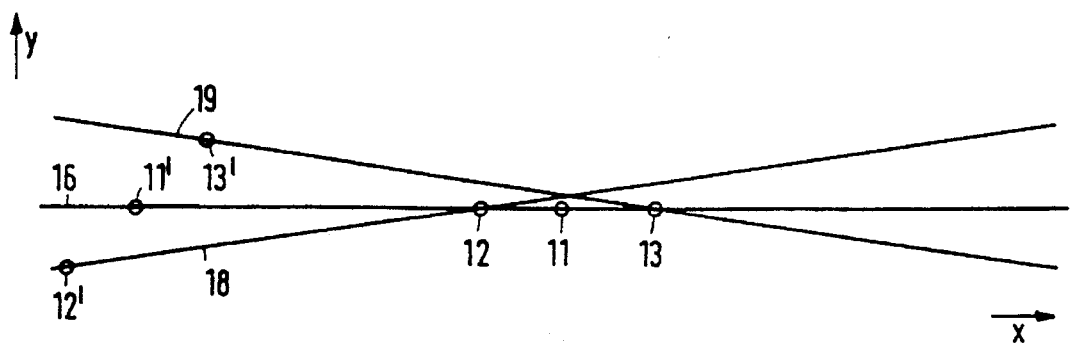
FIG. 10

DEVICE FOR REALIZING A LONGITUDINAL PATTERN OF SUBSTANTIALLY PARALLEL TRACKS IN A RECORD CARRIER WHICH CONTROLS MOVEMENT OF THE RECORD CARRIER ON THE BASIS OF TRACKPITCH

BACKGROUND OF THE INVENTION

The invention relates to a device for realising in a recording layer of a record carrier a longitudinal path of substantially parallel tracks which have a track direction transverse to the longitudinal direction of the path, the device comprising an optical system for focusing a radiation beam at the recording layer, which radiation beam causes a scanning spot to develop on the layer scanning unit means for causing the scanning spot to be displaced with a specific repetition rate over the layer along a scanning path that has a specific scanning direction, and a driver unit for causing the record carrier to be displaced relative to the scanning unit with a certain velocity in a direction transverse to the scanning direction. Such a device is known from U.S. Pat. No. 4,901,297.

In the scanning device disclosed in that patent, a recording surface corresponding to the scanning surface of a magnetooptical tape-like record carrier is scanned by a scanning spot in a direction transverse to the longitudinal direction of the tape-like record carrier. To achieve this scanning, a laser beam is focused at the record carrier via facets of a rotating polygon mirror. The tape is moved in the longitudinal direction, so that the recording surface is scanned in parallel relatively short scanning paths.

The tape-like record carrier comprises a prerecorded pattern used as a reference for controlling the position of the scanning spot during the scanning operation. The necessity of the use of a record carrier comprising a prerecorded reference pattern renders the manufacture of a tape-like record carrier complicated.

SUMMARY OF THE INVENTION

It is an object of the invention to provide a device as defined in the opening paragraph in which information can be recorded on a record carrier that does not contain a prerecorded reference pattern. In accordance with the invention, this object is achieved by the device further comprising an optoelectrical measuring unit for deriving from the track pattern a measuring signal which is related to the track pitch of successively realised tracks, and a control means for controlling the displacement of the record carrier relative to the scanning spot in response to the measuring signal.

In the device according to the invention the track pattern realised by the device itself is used for deriving a measuring signal that is a measure for the pitch of the track pattern that has been realised. The control unit for controlling the displacement of the record carrier may then ensure that the track pitch is maintained at a desired value without a previously realised reference pattern.

A first embodiment for the device is characterized in that the electrooptical measuring unit comprises a further optical system for focusing a radiation beam at a track pattern, the track pattern transforming the incoming radiation beam into a zero$^{th}$ order beam and a first-order beams, and detection unit for deriving as the measuring signal a detection signal that is indicative of the angle between the zero$^{th}$ beam and one of the first-order beams. In this embodiment, the fact that the angle between the zero$^{th}$ order beam and the first-order beam is indicative of the track pitches in the optical grid formed by the tracks is advantageously utilized.

A second embodiment for the device is characterized in that the optical system comprises a focusing unit for focusing a satellite beam together with the scanning beam at the recording layer, the satellite beam causing a satellite scanning spot to occur on the recording layer which spot is located at a predefined position relative to the scanning spot, and the electrooptical measuring unit comprising a detection system for deriving the measuring signal based upon the radiation coming from the satellite scanning spot.

BRIEF DESCRIPTION OF THE DRAWINGS

Further embodiments for the device, as well as for advantages thereof, will be described in detail hereinafter with reference to the FIGS. 1 to 14, in which:

FIGS. 1, 3, 4, 5, 8 and 9 show different embodiments for the device according to the invention;

FIG. 2 shows a track pattern realised by the device according to the invention;

FIG. 6 shows in detail a track pattern and scanning spots;

FIG. 7 shows a relation between a signal Vp and the position of the scanning spot;

FIG. 10 shows scanning paths followed by the scanning spots in the device shown in FIG. 9;

DESCRIPTION OF THE PREFERRED EMBODIMENTS

Figure 3:
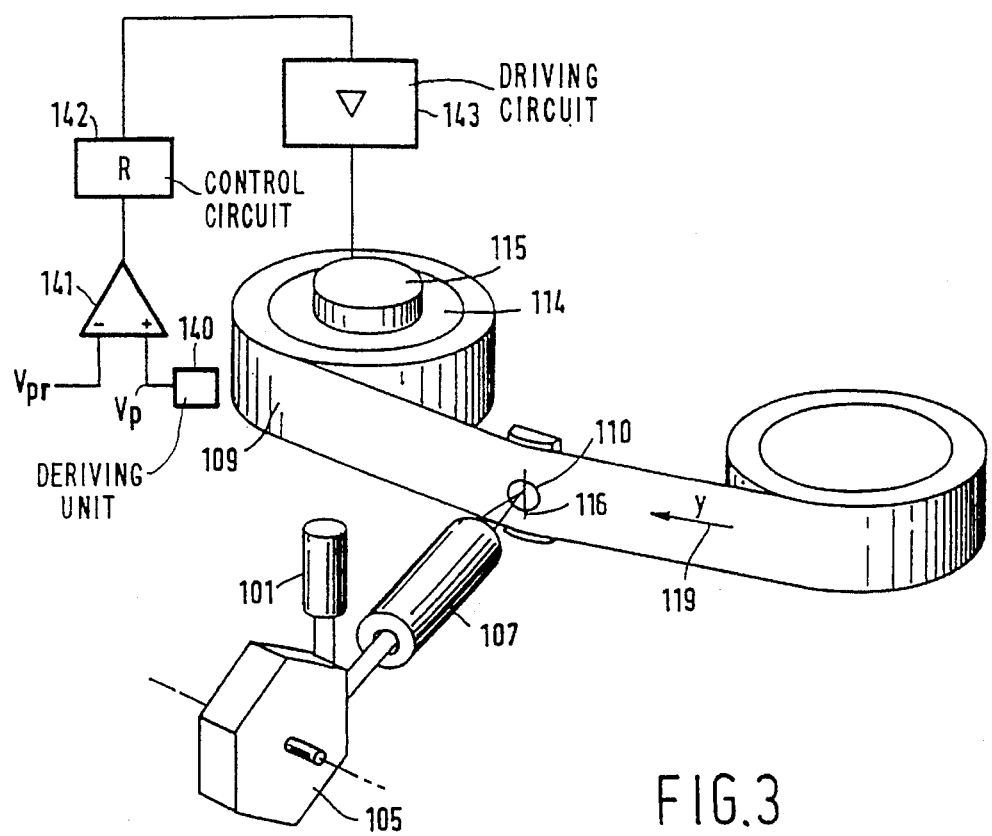

FIG. 1 shows an embodiment for a scanning device. The scanning device shown comprises an optical scanning system formed by a light wave 101, a rotary polygon mirror 105 and a focusing objective 107. The light wave 101 may be of a type as is customarily used in optical or magnetooptical recording and/or reading devices. Such a light wave comprises generating means for generating a radiation beam 102. The radiation beam 102 is focused via the polygon mirror 105 and the focusing objective 107 at a layer of a tape-like medium 109, for example, a record carrier having a radiation-sensitive recording layer, which layer undergoes an optically detectable change under the influence of the radiation coming from the radiation beam 102. This recording layer may be of a magnetooptical or optical type. The radiation beam 102 is focused by the focusing objective 107 to a very small scanning spot 111 on the recording layer of the record carrier 109. An area 110 on the recording surface where the radiation beam 102 hits the recording layer is shown in detail. In the area 110 shown in detail the scanning spot 111 shown is caused by the radiation beam 102.

The polygon mirror 105 has reflecting facets 108 and is rotated around an axis 117 by customary driving means (not shown) which are extensively described, for example, in U.S. Pat. No. 5,171,984 and European Patent Application 0 459 586, which documents are incorporated herein by reference. The polygon mirror 105 is positioned relative to the light wave 101 so that, on rotation of the polygon mirror 105 around the axis of rotation 117, always a next facet of the facets 108 is hit by the radiation beam 102, so that the recording layer is recurrently scanned by the scanning spot 111 and the scanning spot 111 follows a scanning path 116. The repetition rate fh of the scanning along the scanning path 116 is equal to the number of revolutions per minute (r.p.m.) of the polygon mirror 105 times the number of facets 108 of the polygon mirror 105.

The embodiment shown in FIG. 1 further includes displacement means for displacing the record carrier 109 relative to the optical system with a velocity v in a direction y transverse to the direction of the scanning path 116 indicated by an arrow 119. These displacement means may be of a customary type diagrammatically shown in FIG. 1 and comprising a reel 114 driven by a motor 115 for winding the tape-like record carrier 109 which is transported by this reel in the direction y that corresponds to a longitudinal direction of the tape-like record carrier 109.

The recording device described above realises successive tracks which carry effects on the scanning path 116 scanned by the scanning spot 111 on a recording layer of the record carrier 109. In this manner a regular pattern of parallel tracks is realised, a new track being written each time the scanning spot 111 scans the recording layer. FIG. 2 shows by way of illustration the track pattern thus obtained, the tracks being designated by reference character 120. The length of the tracks is referenced 1 and the distance between the middles of the tracks, also termed track pitch, is denoted p. With a given velocity v and a repetition rate fh the track pitch is equal to v/fh.

When the polygon mirror 105 is driven, the r.p.m. will generally remain constant because the operating conditions affecting the r.p.m. for the polygon mirror 105 do not vary or vary only slightly. This is in contrast to the drive of the record carrier. Therefore, preference should be given to having the record carrier drive include a feedback control for controlling the velocity v. This may be effected, for example, by deriving in a customary fashion a measuring signal Vp which is indicative of the track pitch. FIG. 3 shows by way of example an embodiment in which this is realised, in which the elements corresponding to those shown in FIG. 1 carry like reference characters. Reference character 140 denotes an electrooptical deriving means which derives the measuring signal Vp from the realised track pattern. The measuring signal Vp is applied to a non-inverting input of a comparator circuit 141. An inverting input of the comparator circuit 141 is supplied with a reference signal Vpr which is indicative of a desired velocity. The comparator circuit 141 applies an output signal to a control circuit 142, which output signal is indicative of the difference between the measuring signal Vp and the reference signal Vpr. An output signal of the control circuit 142 triggers a control signal for a driving circuit 143 to drive the motor 115. The control circuit 142 is one of a customary type which produces a control signal in response to the output signal of the comparator circuit 141 for which control signal the difference between Vp and Vpr remains substantially equal to zero.

Figure 4:
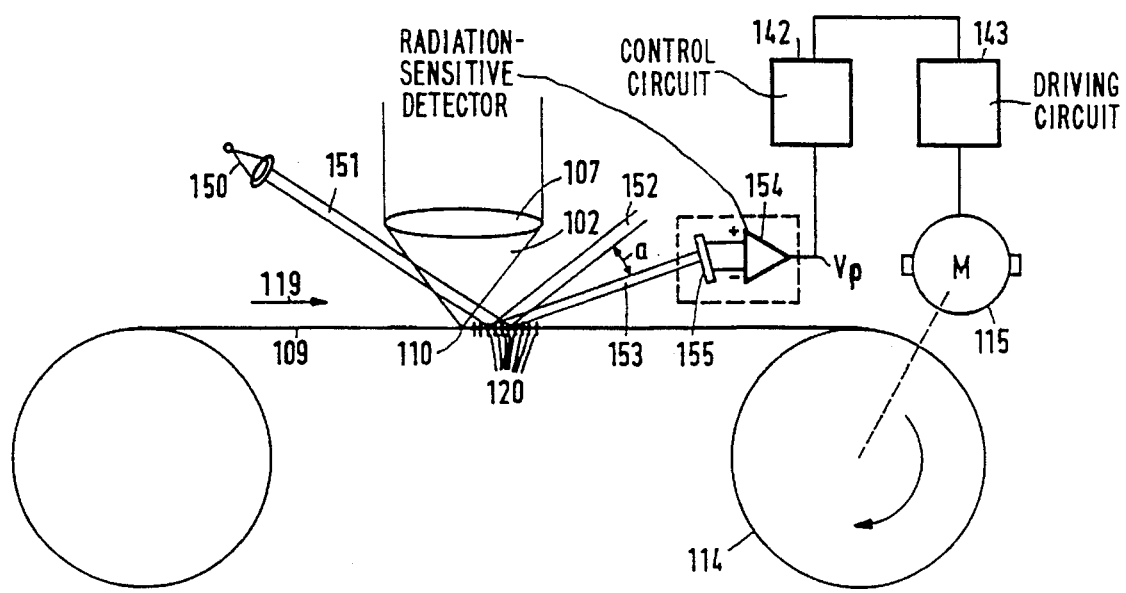

FIG. 4 shows in more detail an embodiment for which the velocity of the record carrier 109 is controlled as a function of the measuring signal Vp. FIG. 4 shows the components as they are shown in Figs. 1 and 3 already described which carry like reference characters. For deriving the measuring signal Vp, the device comprises a light source 150 which is, for example, a semiconductor laser, for generating a radiation beam 151. The radiation beam 151 is focused at the track pattern formed by the tracks 120, which pattern is at a short distance from the location where the scanning spot 110 recurrently scans the recording layer. As a result of the regular structure formed by the track pattern, the radiation beam 150 is transformed into an outgoing zero$^{th}$ order beam 152 and outgoing higher-order beams. From these higher-order beams there is shown only a first-order beam 153. The size of the angle a between the zero$^{th}$ order beam 152 and the first-order beam 153 depends on the track pitch of the tracks 120. By means of a radiation-sensitive detector 154 a signal is derived which denotes how much angle a deviates from the angle of the desired track pitch. The radiation-sensitive detector 154 is one of a customary type producing a signal that denotes the deviation between the middle of the radiation-sensitive surface 155 and the spot where the radiation beam is incident on the radiation-sensitive surface 155. The radiation-sensitive detector is arranged in such a way that in the case where the angle a corresponds to the desired angle, the first-order beam hits the radiation-sensitive surface 155 of the detector 154 in the middle.

The output signal of the detector 154 is always indicative of a deviation between the real track pitch of the tracks 120 and the desired track pitch. For that matter, this output signal is used as the measuring signal Vp. The measuring signal Vp is applied directly to the control circuit 142 in the embodiment shown in FIG. 4.

FIG. 5 shows an embodiment in which the signal Vp is derived in a different manner. In that figure, the parts corresponding to those shown in the other figures are again designated by like reference characters.

In lieu of the light wave 101, the device shown in FIG. 5 comprises an adapted light wave 101a which generates a satellite radiation beam 103 in addition to the radiation beam 102. The satellite radiation beam 103 is also focused at the recording layer of the record carrier 109 via the objective 107 and causes a very small satellite scanning spot 112 on the recording layer of the record carrier 109. The intensity of the beam 103 is insufficient to cause a change in the recording layer. The beam 103 is focused such that with a desired track pitch of the tracks 120 the middle of the satellite scanning spot coincides with an edge of the track realised previously. By way of illustration FIG. 6 shows the position of the scanning spots 111 and 112 for the case where the spacing of two successive tracks 120 is equal to the desired track pitch. The radiation beam 103 reflected by the record carrier 109 is led back to the light wave 101a via the focusing objective 107, in which light wave the reflected beam is directed at a radiation-sensitive detector of the customary type which produces a detection signal indicating the power of the received radiation. The output signal of the detector functions as the signal Vp. FIG. 7 shows by way of illustration the power of the signal Vp as a function of the distance between the track instantaneously recorded by the scanning spot 111 and the adjacent track. The signal value Vp0 corresponds to the desired track pitch p0. The comparator circuit 141 compares the signal Vp with a reference signal Vpr which has a signal value corresponding to Vp. The result of the comparison is applied to the control circuit 142.

Figure 8:
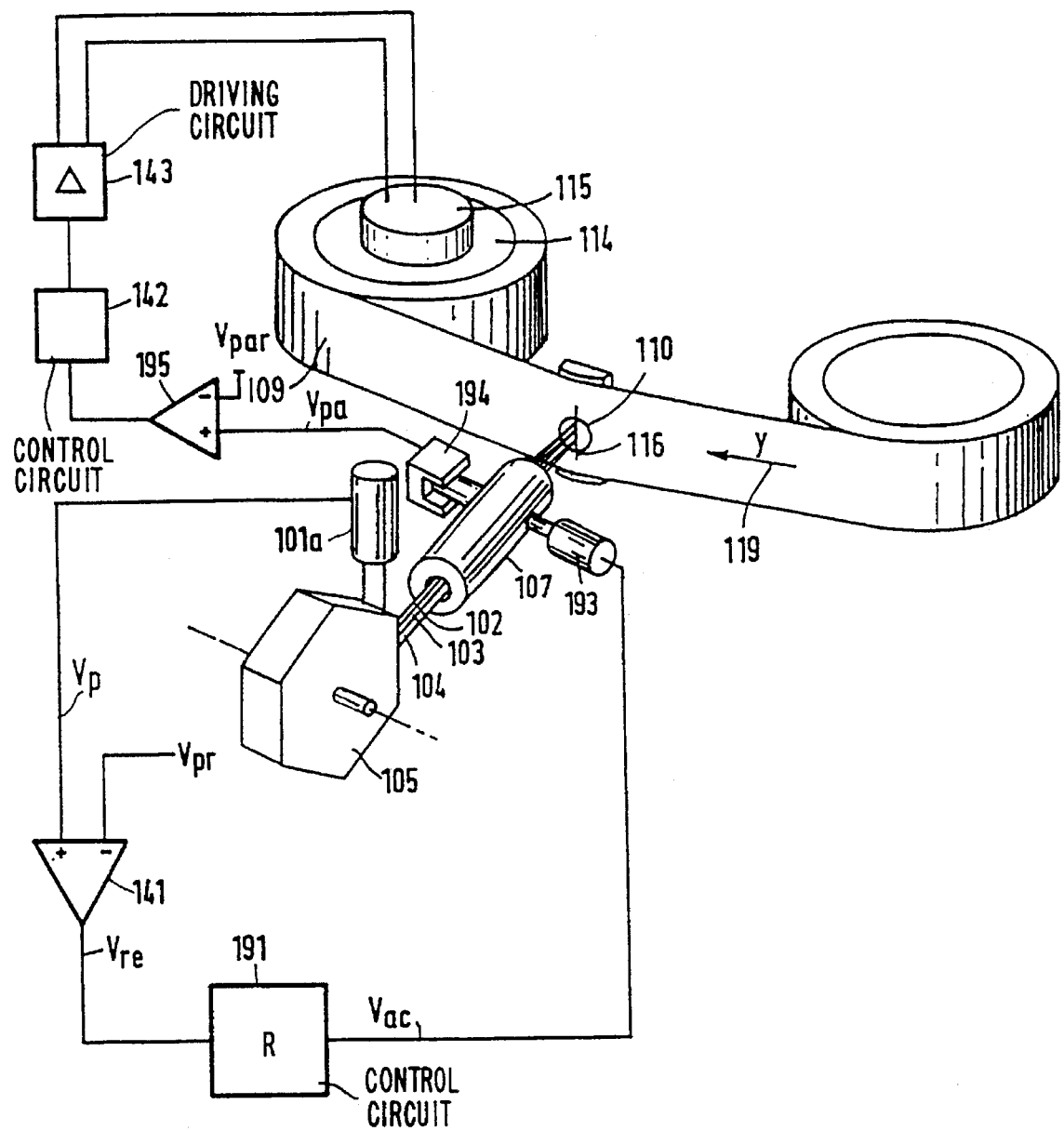

By controlling the velocity of the record carrier 109 it is only possible to remove relatively low frequency interference. For removing interference of a higher frequency, a fast control may be used which displaces the scanning spot 111 in a direction transverse to the scanning direction by influencing part of the optical system. Such a fast displacement may be obtained by moving the position of the objective 107 in a direction transverse to the scanning direction by means of a high speed actuator. Since the area in which a scanning spot is displaced as a result of the displacement of the objective 107 is only small, the velocity of the record carrier is preferably controlled in response to a measuring signal indicating the position of the objective 107, so that the objective 107 is kept in the middle of its area of displacement on average. FIG. 8 shows an embodiment for a device according to the invention in which the position of the objective 107 is controlled in response to the measuring signal Vp and in which the velocity of the record carrier is controlled in response to a signal indicating the position of the objective 107. In this figure, the components corresponding to those shown in other figures are again designated by like reference characters. The output signal of the comparator circuit 141 is applied to a control circuit 191 which derives in customary fashion a control signal Vac from the input signal Vre. The control signal Vac is applied to an actuator 193 which is capable of displacing the focusing objective 107 and thus displacing the scanning spot 111 and 112 in a direction transverse to the direction of the tracks within a specific limited area. The location of the scanning spots in the area of displacement is determined by a position detector 194 which produces a position signal Vpa indicating the position of the objective 107. It is noted that the position signal Vpa may also be derived differently. For example, in the case where the focusing objective is spring mounted, the DC component of the signal applied to the actuator 193 is indicative of the position of the objective displaced by the actuator. The signal Vpa is compared to a reference signal Vpar by a comparator circuit 195, while the signal value of this reference signal corresponds to a position of the actuator in which the positions of the scanning spot 111 and 112 caused by this actuator lie about midway between their area of displacement.

An output signal of the comparator circuit 195, which signal indicates the difference between the signals Vpa and Vpar, is applied to the control circuit 142. The feedback control system formed by the elements 142, 143, 195 keeps the objective 107 in its middle position by controlling the velocity of the record carrier.

The relation between the signal Vpa and the track pitch is as follows. In the case where the actual track pitch deviates from the desired track pitch, the actuator 193 will cause the objective 107 to be displaced to correct the track pitch. As a result, the objective is driven out of the centre of its area of displacement, which results in a change of the signal value of the signal Vpa. As the signal Vpa changes, the velocity of the record carrier 109, and thus the track pitch, is adjusted.

With reference to FIGS. 9 to 14 an embodiment of the invention will be described in which the measuring signal Vp indicating the track pitch is derived differently. In these figures the components corresponding to those in other figures are designated by like reference characters.

The scanning device shown in FIG. 9 comprises an optical scanning system formed by a light wave 1, a rotary polygon mirror 5, a deflecting mirror 6 and a focusing objective 107. The light wave 1 may be of a type customarily used in optical or magnetooptical recording and/or reading devices. Such a light wave comprises generating means for generating three radiation beams 2, 3 and 4 whose directions show slight mutual discrepancies and of which two (2 and 4) have a symmetrical position relative to a central radiation beam (3). The radiation beams 2, 3 and 4 are focused at the record carrier 109 via the polygon mirror 5, the deflecting mirror 6 and the focusing objective 107. The focusing objective 107 focuses the radiation beams 2, 3 and 4 to very small scanning spots on the recording layer of the record carrier 109. The positions of the scanning spots differ because the directions of the three radiation beams differ. The area 110 on the recording layer where the radiation beams hit the record carrier 109 is shown in detail. In the area 110 shown in detail a first scanning spot caused by the radiation beam 3 is referenced 11. A second and a third scanning spot caused by the respective radiation beams 2 and 4 are referenced 12 and 13, respectively.

The polygon mirror 5 has reflecting facets 8a, . . . , 8g and is rotated around an axis 17 by customary driving means (not shown) which are extensively described, for example, in U.S. Pat. No. 5,171,984 and European Patent Application 0 459 586, which documents are deemed incorporated herein by reference. The polygon mirror 5 is positioned relative to the light wave 1 so that, on rotation of the polygon mirror 5 around the axis of rotation 17, always a next facet of the facets 8a, . . . , 8g is hit by the radiation beams 2, 3 and 4, so that the recording layer is recurrently scanned by the scanning spots 11, 12 and 13 and the scanning spots 11, 12 and 13 synchronously move over the recording layer following their respective scanning paths 16, 18 and 19 (see FIG. 10). Since the radiation beams 2 and 4 are positioned symmetrically relative to the radiation beam 3, the scanning spots 12 and 13 caused by the radiation beams 2 and 4 are symmetrical relative to the scanning spot 11 caused by the radiation beam 3.

The polygon mirror 5 has the form of a truncated pyramid whose sloping sides form the facets 8a, . . . , 8g and whose axis of rotation 17 intersects the base in its middle and forms a right angle to this base. Worded differently, the facets 8a, . . . , 8g form an oblique angle to the axis of rotation 17 of the polygon mirror 5. These oblique angles cause the scanning paths followed by the scanning spots 11, 12 and 13 not to be parallel, but to intersect as is represented in FIG. 10. The cause of this will be explained hereinafter with reference to the drawing FIGS. 11 and 12.

Figure 11:
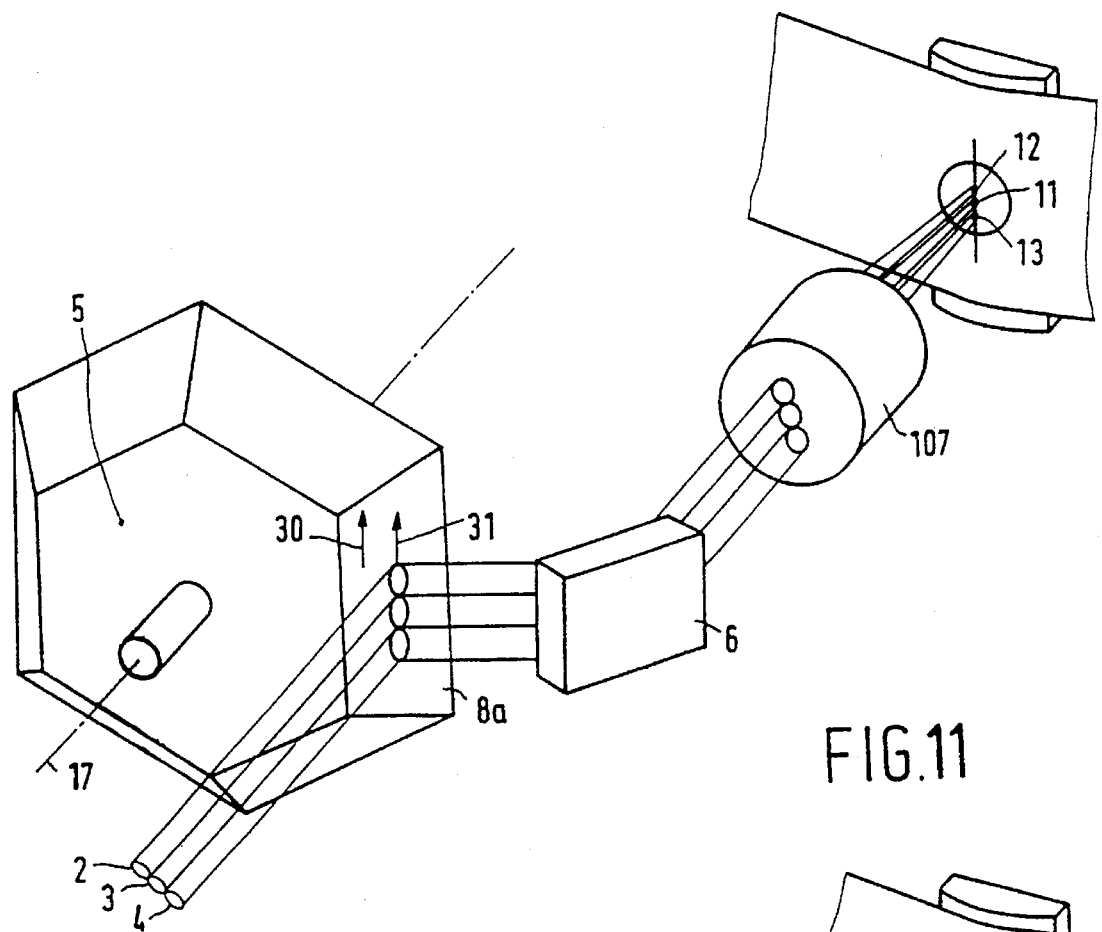
FIGS. 11 and 12 show different positions of a polygon mirror for the benefit of the explanation of the operation of the embodiment shown in FIG. 9.

FIG. 11 shows the polygon mirror 5 in a position in which the radiation beams 2, 3 and 4 hit the facet 8a approximately in the middle. The spots where the radiation beams 2, 3 and 4 hit the mirror facets determine the direction indicated by an arrow 31. An arrow 30 indicates a direction of an intersecting line of a plane perpendicular to the axis of rotation 17 and the surface of the facet 8a.

Figure 12:
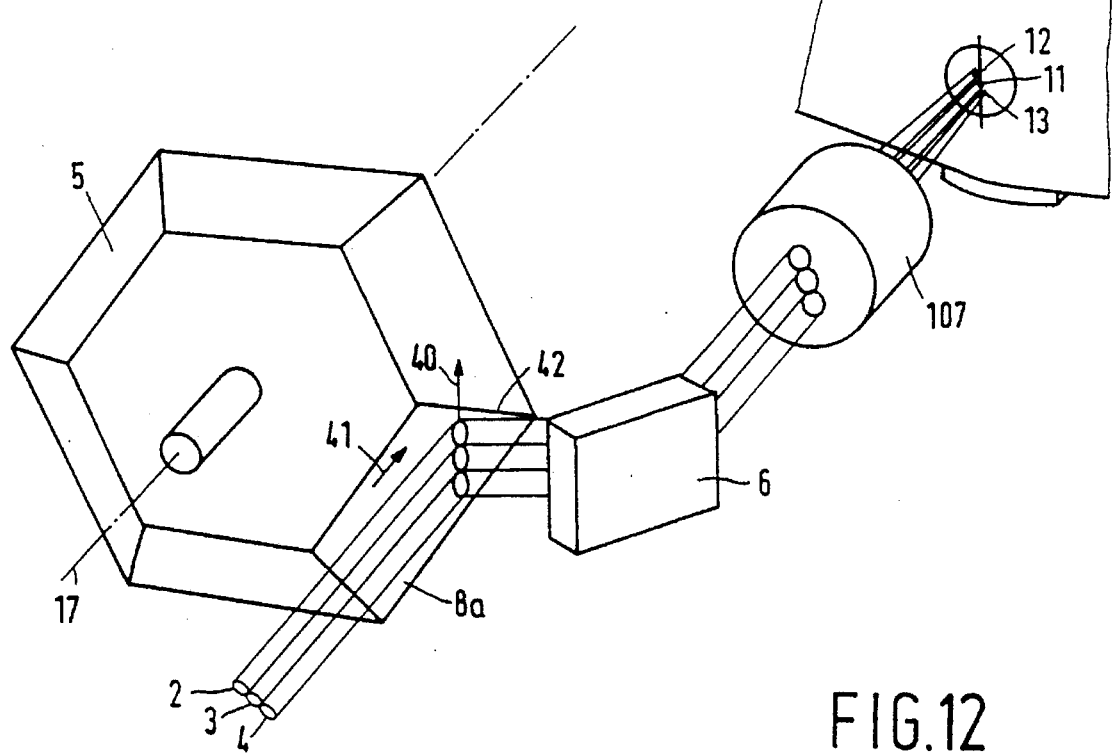
Figure 13:
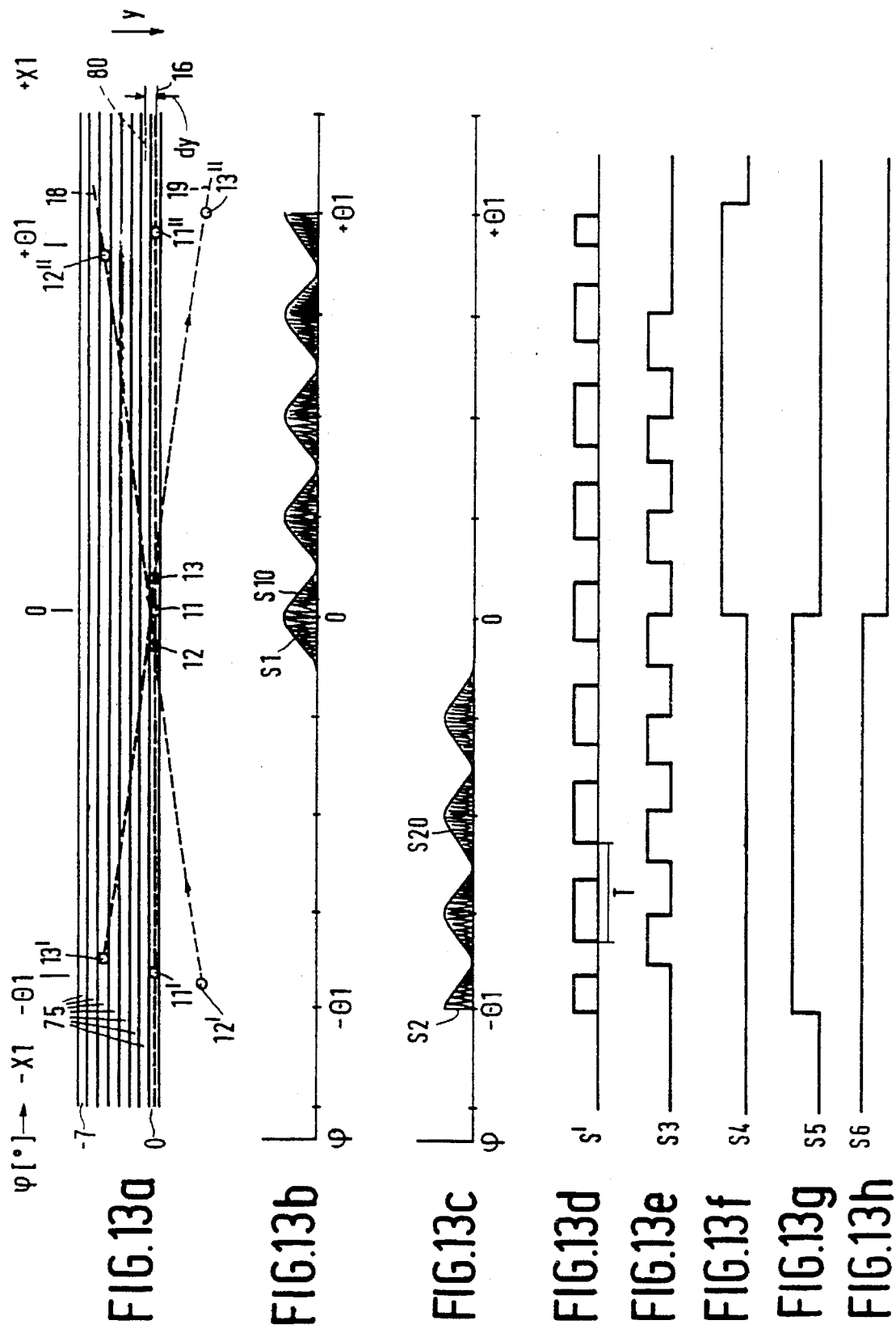
FIGS. 13a–h show scanning paths of scanning spots and associated signals.

FIG. 12 shows the polygon mirror 5 in a position in which the radiation beams 2, 3 and 4 hit the facet 8a near an edge 42. In this position the spots where the radiation beams 2, 3 and 4 hit the facet determine a direction indicated by an arrow 40 which direction deviates from that of an intersecting line of a plane perpendicular to the axis of rotation 17 and the plane of facet 8a indicated by arrow 41.

The mutual positions of the spots where the radiation beams hit the facet for the position of the polygon mirror 5 shown in FIG. 11 correspond to the positions of the scanning spots shown in FIG. 10 and referenced 11, 12 and 13. The positions of the scanning spots 11', 12' and 13' correspond to the situation shown in FIG. 12.

The mutual variations of the positions of the scanning spots result in displacements of the scanning spots 12 and 13 relative to the scanning spot 11 in a direction y transverse to the scanning path 16, with the positions of the scanning spots 12 and 13 relative to the first scanning spot 11 being related to the position of the polygon mirror and thus to the location x of the first scanning spot 11 on the first scanning path 16.

In the embodiment described above, a deflecting element rotatable around an axis of rotation is used in the form of a polygon mirror 5 which has facets 8 forming an oblique angle to the axis of rotation 17 to obtain synchronous movements of the scanning spots 11, 12 and 13 in a way in which mutual displacements of the scanning spots 11, 12 and 13 in the direction y transverse to the scanning directions take place, and the position of the scanning spot 12 and scanning spot 13 relative to the scanning spot 11 is related to the location x of the scanning spot 11 on the first scanning path 16. Such movements of the scanning spots, however, may also be obtained with different deflecting elements from a polygon mirror, which have facets forming an oblique angle to the axis of rotation. For a description of optional alternatives, reference is made to Belgian Patent Application No. 09301395, to which co-pending U.S. patent application 08/248,946 filed May 25, 1994 corresponds.

For realising tracks containing information patterns, the intensity of the radiation beam 3 is generally switched during the scanning operation between a writing level sufficiently high to cause a change in the recording layer and a reading level that is not high enough to cause any effect. It should be observed that with magnetooptical recordings the effects may also be obtained by means of a magnetic field varying in strength, which is realised on the spot on the recording layer scanned by a radiation beam. The intensity of the radiation beams 2 and 4 have a level that is not high enough to cause optically detectable effects in the recording layer, so that undesired effects are avoided.

By way of illustration, FIG. 13a shows the way in which tracks 75 are obtained in the manner just described. The tracks 75 are numbered −7, . . . , −1, 0. The position along the scanning path 16 is indicated by a magnitude x, and the associated position of the polygon mirror 5 is indicated by a magnitude phi which indicates in degrees the position of the facet used for the scanning relative to its central position. There is an unambiguous relation between the position of the polygon mirror 5 and the position x of the scanning spot 11 on the scanning path 16. The positions of the scanning spot which are caused by the radiation beam 3 for three different values of phi (phi=−θ1, phi=0 and phi=+θ1) are referenced 11', 11 and 11". The positions of the scanning spots which spots are caused by the radiation beams 2 and 4 are referenced 12' and 13', 12 and 13 and 12" and 13" for the three values of phi mentioned above. The scanning spot 11 moves along the path 16, whereas the scanning spots 12 and 13 move along the paths 18 and 19 intersecting path 16. When the scanning spot 11 is displaced from position x=−x₁ mm to x=0 mm, the scanning spot 13 passes a number of tracks, whereas the scanning spot 12 moves along a part of the recording layer in which no tracks 75 have yet been realised. When the scanning spot 11 is displaced from position x=0 mm to x=+x₁ mm, the scanning spot 12 passes a number of tracks 75, whereas the scanning spot 13 moves along a part of the recording layer in which no tracks 75 have yet been made. At the locations where the scanning spots 12 and 13 coincide completely or in part with one of the tracks 75, the radiation reflected by the record carrier 109 will be modulated in accordance with the pattern of effects occurring in track 75, also termed information pattern. The degree of modulation corresponds to the degree to which the scanning spot coincides with the track 75.

The recording device comprises detection systems of a type known per se for converting radiation coming from scanning spots 12 and 13 into detection signals S1 and S2 which correspond to the reflected radiation modulation caused by the information pattern. In the embodiment shown in FIG. 9 reference characters 70 and 71 denote detection systems for converting radiation coming from scanning spots 12 and 13, which radiation returns to the light wave 1 via the focusing objective 107, the reflecting mirror 6 and the polygon mirror 5. The detection systems 70 and 71 may be of a general type and do not themselves form any part of the invention and are therefore represented only diagrammatically.

Furthermore, the recording device shown in FIG. 9 includes means for generating a reference signal S3 which is indicative of the position of the first scanning spot 11 on the scanning path 16 as well as a measuring circuit 72 for deriving at least the measuring signal Vp from the detection signals S1 and S2 and the reference signal S3. The derivation of the measuring signals Vp will be explained hereinafter.

As already stated above, the scanning spots 11, 12 and 13 perform synchronous movements. Changes in the interspacing or the scanning spots seen in the direction y transverse to the direction of the scannings are related to the position of the polygon mirror 5 and hence related to the position of the scanning spot 11 on the first scanning path 16. The middles of the scanning spots 12 and 13 coincide for predetermined values of phi with the middles of the previously formed tracks 75. The predetermined values of phi for which this takes place are independent of the distance from the scanning path 16 to the track 75 passed by the scanning spot 12 or 13. Since the spacing of the prerecorded tracks 75 has a constant value equal to the track pitch, the values of phi for which the middles of the scanning spots pass the middles of the tracks 75 depend on a distance dy between the scanning path 16 and the middle of the track 75 recorded last (track carrying the track number −1 in FIG. 13a). This means that the maximum and minimum modulations of the detection signals occur with predetermined positions of the polygon mirror 5.

By way of illustration, FIG. 13b shows the detection signal S1 plotted against phi and against the position x for the case where the distance dy from the scanning path 16 to the middle of the adjacent track, indicated by line 80, corresponds to a desired track pitch. The detection signal S2 is plotted in FIG. 13c against phi for part of the scanning path 16 for the case where the distance dy corresponds to the desired track pitch. Furthermore, the envelopes S10 and S20 of the detection signals S1 and S2 are shown in FIGS. 13b and 13c. These envelopes S10 and S20 approximately have a sinusoidal behaviour which expresses the degree of modulation of the associated detection signals S1 and S2. The maximum values of each of the envelopes S10 and S20 denote the positions for which the modulations of the detection signal are largest. They are the positions in which the middle of the associated scanning spot coincides with the middle of one of the tracks. As shown in FIGS. 13b and 13c, there is a relation between the detection signals S1 and S2 and phi (and hence the position x). This relation depends on the distance dy. If this distance changes, the positions at which the maximum and minimum values of the envelopes S10 and S20 are found, will change. For that matter, the middles of the scanning spots 12 and 13 coincide with the middles of the tracks 75 with different positions x of the scanning spot 11. For example, when the distance dy is reduced, the position values at which the maximum and minimum values of the envelope S10 occur will undergo a change in negative direction (further to be referenced postcursing) and the position values at which the maximum and minimum values occur in the envelope S20 will undergo a change in positive direction (to be referenced precursing hereinafter). Conversely, when the distance dy is increased, the position values at which the maximum and minimum values of the envelope S10 occur will undergo a change in positive direction (precursing) and the position values at which the maximum and minimum values of the envelope S20 occur will undergo a change in negative direction (postcursing). Accordingly, deviation of the relation between the detection signals S1 and S2 relative to the relation belonging to the value of the distance equal to the desired track pitch is thus indicative of a difference between the distance dy and the desired track pitch. It should be observed that due to the symmetrical position of the scanning spots 12 and 13 relative to the scanning spot 11, the influence of a change of dy on the relation between the detection signal S1 and the position x is contrary to the influence on the relation between the detection signal S2 and the position x.

A deviation in the relation between the detection signals S1 and S2 and the reference signal S3 is measured by the measuring circuit 72.

The reference signal S3 may, for example, be a position signal whose signal value corresponds to the position of the deflecting element (polygon mirrors in the embodiment shown) and thus by the position x of the scanning spot 11.

The reference signal S3 is obtained from a position detector 73. The position detector may be included in a control system for controlling the velocity and/or position of the polygon mirror 5. Driver circuits in which information signals are available which indicate the position of the driven object are widely known and will therefore not be described in detail.

Figure 14:
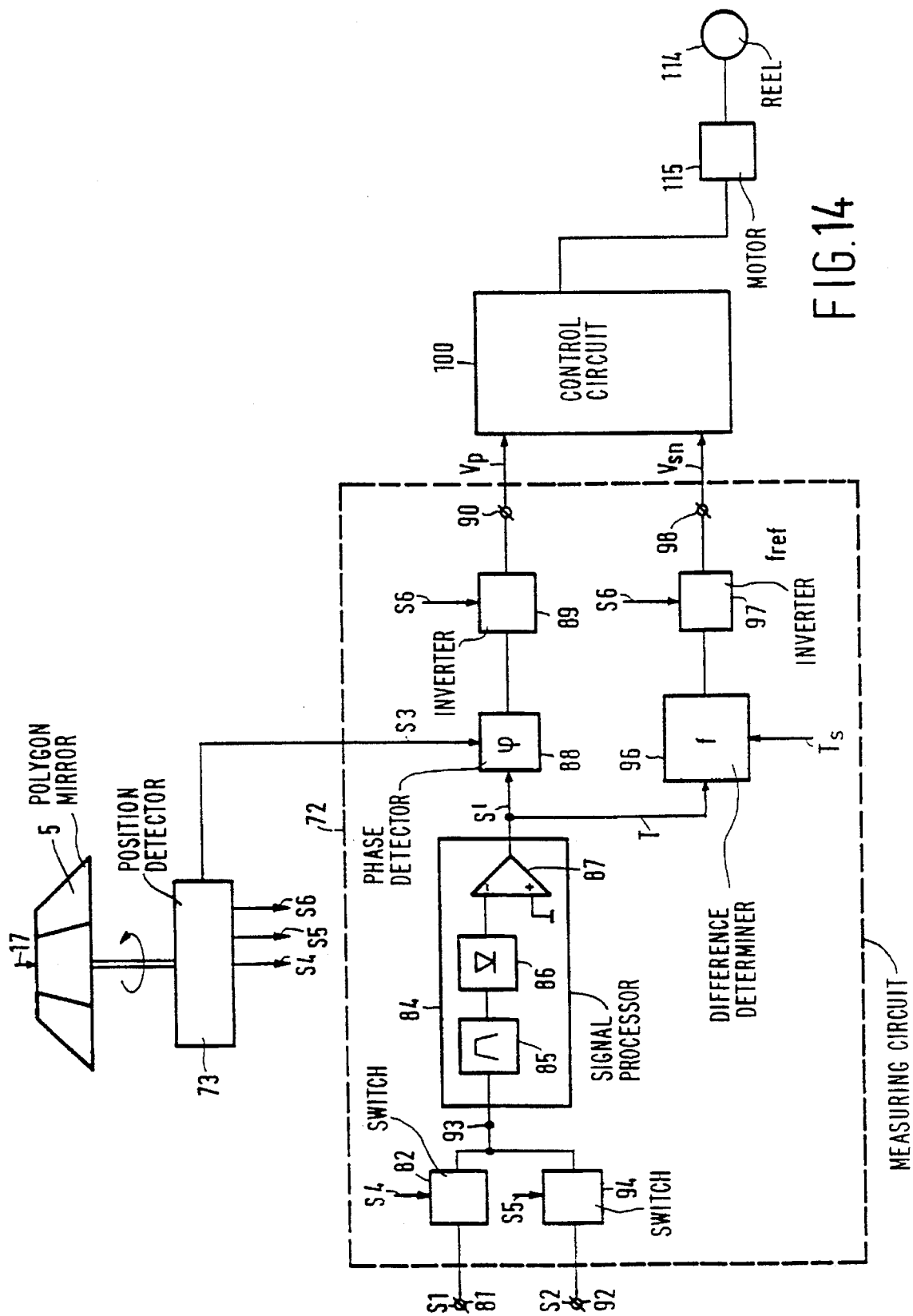
FIG. 14 shows in detail part of the embodiment shown in FIG. 9.

FIG. 14 shows an embodiment for the measuring circuit 72. The measuring circuit 72 has an input 81 for receiving the detection signal S1. The input 81 is connected by a switch 82 controlled by a signal S4 to an input 93 of a signal processor 84. Signal processor 84 converts its received detection signal to a binary signal S' whose first logical value indicates that the scanning spot belonging to the detection signal is substantially located on one of the tracks 75 and whose second logical value indicates that the corresponding scanning spot is substantially located between two tracks 75. The signal processor 84 may be of a customary type also referenced track loss detector. Such a track loss detector may comprise, for example, a series combination of a bandpass filter 85, an envelope detector 86 and a comparator 87.

The signal S' is available on an output of the circuit 84 and is applied to a phase detector 88. By way of illustration the signal S' in FIG. 13d is shown as a function of phi. An output of the phase detector 88 is connected to an output 90 of the measuring circuit 72 via an inverter circuit 89 controlled by a signal S6.

The measuring circuit 72 further has an input 92 for receiving the detection signal S2. The input 92 is connected to an input 93 of the circuit 84 via a switch 94 controlled by a signal S5.

The phase detector 88 is further supplied with a signal S3 which in this embodiment is pulse-shaped and whose edges indicate the positions of which the maximum and minimum values in the detection signals are to occur. By way of illustration FIG. 13e shows the reference signal S3 as a function of the position phi.

Furthermore, FIGS. 13f, 13g and 13h show the respective signals S4, S5 and S6.

Signal S4 has a logical "1" value for 0<phi<θ1. For these values of phi the scanning spot 12 is located in a part of the recording layer on which tracks 75 have already been realised and the detection signal S1 shows a modulation caused by these tracks.

The signal S5 has a logical "1" value for −θ1<phi<0. For these values of phi the scanning spot 13 is located in a part of the recording layer in which tracks 75 have already been made and the detection signal S2 shows a modulation caused by these tracks 75.

The signal S6 has a logical "1" value for −30<phi<0. The edge (signal level transition) for the value of phi=0 indicates the boundary between the section in which the scanning spot 12 is located in the track area 75 and the section in which there are no tracks 75.

The signals S3, S4, S5 and S6 may be generated in customary fashion by the position detector 73. Such a position detector 73 may for this purpose be coupled to a spindle of the polygon mirror 5. Such a position detector coupled to the spindle of the polygon mirror 5 may comprise a so-called pulse disc, in combination with counting circuits, as required. Such position detectors may be known per se and do not form part of the invention and, therefore, will not be described in detail.

The operation of the measuring circuit 72 will be further explained hereinbelow. The polygon mirror 5 is driven with a constant angle velocity, so that the value of phi (indicating the position of the facet used for the deflection) is constantly varying in a range from −30 to 30 degrees. In the sub-range θ1<phi<0 the detection signal S2 will be passed to circuit 84 via the switch 94 controlled by the signal S5. The phase difference between the reference signal S3 and the signal S' derived from the detection signal S2 is determined by the phase detector 88. This phase difference is 90 degrees (see FIG. 13) for the desired value of dy. The phase detector 88 is of a type producing a phase difference signal whose (average) signal strength is proportional to the phase difference between the signals S' and S3 minus 90 degrees and thus the sign of the (average) signal strength indicates the direction of the deviation of dy relative to the desired track pitch. In a simple form such a phase detector may comprise a so-called EXCLUSIVE-OR circuit. However, lots of different types of phase detectors can be used. The phase difference signal thus obtained, which is a measure for the deviation of dy, is applied unaltered to the output 90 of the measuring circuit 72 via the controllable inverter circuit 89.

The moment the polygon mirror passes the position phi=0, the detection signal S2 is blocked by switch 94 and the detection signal S1 is passed to the input 93 of the circuit 84 via the switch 82 controlled by signal S4. The phase detector 88 detects the phase difference between the reference signal S3 and the signal S' obtained in response to the detection signal S1. As observed earlier, the effect of dy on the detection signal S1 is contrary to the effect of dy on the detection signal S2. A correction of this is made by the inverter circuit 89 controlled by the signal S6. For that matter, the moment (phi=0) at which the detection signal S2 on the input 93 is replaced by the detection signal S1, the inverter circuit 89 is activated leading to an inversion of the phase difference signal available on output 90.

The period T of the signal S' indicates a time difference between two successive track transitions by either scanning spot 12 or 13. If the scanning spot 11 used for recording has a component of movement in the direction y transverse to the tracks 75, this will result in a change of the value T relative to a value Ts which belongs to a situation in which the position of the scanning spot in the direction transverse to the tracks 75 does not change (constant value of dy). The difference between the real value of T and Ts thus indicates the deviation of velocity of the scanning spot 11 in the direction y transverse to the tracks 75.

For determining the difference between the period T of the signal S', the measuring circuit 72 may comprise a circuit 96 of a type known per se. Circuit 96 may comprise, for example, a timer for determining the length of the period T, and a subtracter for determining the difference between the values found for T and Ts. Via an inverter circuit 97 controlled by signal S6, the circuit 96 passes a difference signal, which carries a sign corresponding to the sign of the difference found, to an output 98. The inverter circuit 97 controlled by signal S6 is used for correcting the difference between the influence of a velocity of the scanning spot 11 on the signals S1 and S2.

Hereinbefore, the period of the detection signals is determined for determining a measure for the velocity of the scanning spot. It will be obvious to a person skilled in the art that for obtaining a measure for the velocity of the scanning spot 11, a difference signal may be derived which is related to the period of the signal S', for example, a signal indicating the frequency of the signal S'.

The signal on the output 90 functions as the measuring signal Vp and is indicative of the deviation of the instantaneous track pitch relative to a desired track pitch. The signal on the output 98 is indicative of the velocity of the scanning spot 11 in the direction y transverse to the tracks 75. This signal will in the following be referenced measuring signal Vsn. The measuring signal Vp, possibly in combination with the measuring signal Vsn, can be used for controlling the velocity of the record carrier 109 to a value for which the track pitch assumes the desired value. This may be effected, for example, by adapting the velocity at which the means of displacement (reel 14 and motor 15 in FIG. 1) move in response to a control signal derived by a control circuit 100 from the measuring signal Vp possibly in combination with the measuring signal Vsn.

Although it is advantageous to control the scanning spot 11 and thus the track pitch in response to both the measuring signal Vp and the velocity signal Vsn, this is not necessary. For example, it is possible to control this position only in response to the position measuring signal Sp.

In the embodiment described hereinbefore, the detection signals S1 and S2 are used for deriving the measuring signals Vp and Vsn. The position measuring signal Sp and the velocity measuring signal Vp may also be derived from either detection signal S1 or S2. It will be obvious that in that case generating either radiation beam 2 or 4 may be omitted.

We claim:

1. A device for realizing in a recording layer of a record carrier a pattern of substantially parallel tracks which have a track direction transverse to a longitudinal direction of the pattern, the device comprising:

an optical system for focusing a radiation beam at the recording layer so as to form a scanning spot on the recording layer, which optical system includes scanning means for causing the scanning spot to be displaced with a specific repetition rate over the recording layer along a scanning path that has a specific scanning direction;

driver means for causing the record carrier to be displaced relative to the optical system with a certain velocity in a direction transverse to the scanning direction;

electrooptical measuring means for deriving from the tracks realized in the recording layer by means of the optical system and the driver means a measuring signal which is related to a track pitch of successively realized tracks; and control means for controlling the displacement of the record carrier relative to the optical system in response to the measuring signal.

2. The device as claimed in claim 1, wherein the electrooptical measuring means comprises an additional optical system for focusing an additional radiation beam at the tracks realized, which tracks transform the additional radiation beam into a zero$^{th}$ order beam and first-order beams; and detection means for deriving as the measuring signal a detection signal that is indicative of an angle between the zero$^{th}$ order beam and one of the first-order beams.

3. The device as claimed in claim 1, wherein the optical system further focuses a satellite beam at the recording layer, which satellite beam causes a satellite scanning spot to be formed on the recording layer at a predefined position relative to the scanning spot; and the electrooptical measuring means includes a detection system for deriving the measuring signal based upon radiation coming from the satellite scanning spot.

4. The device as claimed in claim 1, wherein the optical system further focuses a satellite beam at the recording layer, which satellite beam causes a satellite scanning spot to be formed on the recording layer, and the scanning means causes the satellite scanning spot to be displaced over the recording layer along a satellite scanning path, which has a specific scanning direction which is non-parallel to the specific scanning direction of the scanning path of the scanning spot, synchronously with the scanning spot being displaced over the recording layer along the scanning path; and the electrooptical measuring means includes a detection system for deriving the measuring signal based upon radiation coming from the satellite scanning spot.

5. The device as claimed in claim 1, wherein the optical system further focuses a first satellite beam and a second satellite beam at the recording layer, which first satellite beam and second satellite beam cause a first satellite scanning spot and a second satellite scanning spot, respectively, to be formed on the recording layer, and the scanning means causes the first satellite scanning spot and the second satellite scanning spot to be displaced over the recording layer along a first satellite scanning path and a second satellite scanning path, respectively, which are different and which each has a specific scanning direction which is non-parallel to the specific scanning direction of the scanning path of the scanning spot, synchronously with the scanning spot being displaced over the recording layer along the scanning path; and the electrooptical measuring means includes a detection system for deriving the measuring signal based upon radiation coming from at least one of the first satellite scanning spot and the second satellite scanning spot.

6. A device for realising in a recording layer of a record carrier a pattern of substantially parallel tracks which have a track direction transverse to a longitudinal direction of the pattern, the device comprising:

an optical system for focusing a radiation beam at the recording layer so as to form a scanning spot on the recording layer, which optical system includes scanning means for causing the scanning spot to be displaced repetitively over the recording layer along a scanning path that has a specific scanning direction;

driver means for causing the record carrier to be displaced relative to the optical system in a direction transverse to the scanning direction, the displacement of the record carrier by means of the driver means and the displacement of the scanning spot by means of the scanning means resulting in the tracks being realized;

derivation means for deriving a control signal on the basis of a track pitch of successively realized tracks; and control means for controlling the displacement of the record carrier relative to the optical system in response to the control signal.

7. The device as claimed in claim 6, further comprising electrooptical measuring means for deriving from the tracks realized in the recording layer a measuring signal which is related to the track pitch; and wherein the optical system further includes focusing means for focusing the radiation beam at the recording layer, which focusing means is adapted to be displaced in a direction transverse to the scanning direction in response to the measuring signal, and the derivation means derives the control signal on the basis of displacement of the focusing means.

8. The device as claimed in claim 7, wherein the electrooptical measuring means comprises an additional optical system for focusing an additional radiation beam at the tracks realized, which tracks transform the additional radiation beam into a zero$^{th}$ order beam and first-order beams; and detection means for deriving as the measuring signal a detection signal that is indicative of an angle between the zero$^{th}$ order beam and one of the first-order beams.

9. The device as claimed in claim 7, wherein the optical system further focuses a satellite beam at the recording layer, which satellite beam causes a satellite scanning spot to be formed on the recording layer at a predefined position relative to the scanning spot; and the electrooptical measuring means includes a detection system for deriving the measuring signal based upon radiation coming from the satellite scanning spot.

10. The device as claimed in claim 7, wherein the optical system further focuses a satellite beam at the recording layer, which satellite beam causes a satellite scanning spot to be formed on the recording layer, and the scanning means causes the satellite scanning spot to be displaced over the recording layer along a satellite scanning path, which has a specific scanning direction which is non-parallel to the specific scanning direction of the scanning path of the scanning spot, synchronously with the scanning spot being displaced over the recording layer along the scanning path; and the electrooptical measuring means includes a detection system for deriving the measuring signal based upon radiation coming from the satellite scanning spot.

11. The device as claimed in claim 7, wherein the optical system further focuses a first satellite beam and a second satellite beam at the recording layer, which first satellite beam and second satellite beam cause a first satellite scanning spot and a second satellite scanning spot, respectively, to be formed on the recording layer, and the scanning means causes the first satellite scanning spot and the second satellite scanning spot to be displaced over the recording layer along a first satellite scanning path and a second satellite scanning path, respectively, which are different and which each has a specific scanning direction which is non-parallel to the specific scanning direction of the scanning path of the scanning spot, synchronously with the scanning spot being displaced over the recording layer along the scanning path; and the electrooptical measuring means includes a detection system for deriving the measuring signal based upon radiation coming from at least one of the first satellite scanning spot and the second satellite scanning spot.

* * * * *